US012793304B2

(12) United States Patent
Thanasekaran

(10) Patent No.: US 12,793,304 B2
(45) Date of Patent: Nov. 10, 2026

(54) DYNAMIC DEPTH INTEGRATED HOLOGRAPHIC ANIMATIONS SYSTEM

(71) Applicant: Vijayan Thanasekaran, Union City, CA (US)

(72) Inventor: Vijayan Thanasekaran, Union City, CA (US)

( * ) Notice: Subject to any disclaimer, the term of this patent is extended or adjusted under 35 U.S.C. 154(b) by 292 days.

(21) Appl. No.: 18/599,294

(22) Filed: Mar. 8, 2024

(65) Prior Publication Data

US 2024/0319667 A1 Sep. 26, 2024

Related U.S. Application Data

(60) Provisional application No. 63/491,346, filed on Mar. 21, 2023.

(51) Int. Cl.
*G06T 13/20* (2011.01)
*G06T 7/20* (2017.01)

(52) U.S. Cl.
CPC ................ *G06T 13/20* (2013.01); *G06T 7/20* (2013.01)

(58) Field of Classification Search
CPC .................................................... G02B 27/283
See application file for complete search history.

(56) References Cited

U.S. PATENT DOCUMENTS

| | | | | |
|---|---|---|---|---|
| 7,883,212 | B2 | 2/2011 | O'Connell | |
| 8,177,368 | B2 | 5/2012 | O'Connell | |
| 8,692,738 | B2 | 4/2014 | Smithwick | |
| 9,916,717 | B2 * | 3/2018 | Pecećnik | G07F 17/3211 |
| 2016/0139562 | A1 | 5/2016 | Crowder | |
| 2016/0266543 | A1 * | 9/2016 | Crowder | G02B 30/56 |
| 2020/0293146 | A1 * | 9/2020 | Ferris | G06F 1/1601 |
| 2023/0302372 | A1 * | 9/2023 | Deuel | B60L 53/35 |

* cited by examiner

*Primary Examiner* — Clifford Hilaire
(74) *Attorney, Agent, or Firm* — Brennan, Manna & Diamond, LLC

(57) ABSTRACT

An advanced dynamic display system designed to create immersive and interactive 3D holographic images/scenes is disclosed. The system features a reflective sheet angled to the viewer or audience proximal to one or more display devices. Movements of the display devices are synchronized with the content being displayed using an object tracker that analyzes and directs the display devices based on object movements within the video or image. The system enables for both automatic and manual control of the display devices, enhancing the dynamic and interactive nature of the holographic image. The system also includes one or more physical display object packs that are adapted to be rotated to change the displayed objects, adding a physical layer to the holographic illusion. A centralized programmable controller controls the synchronized operation of the display devices and physical object packs, enabling complex 3D animation shows.

14 Claims, 9 Drawing Sheets

DYNAMIC DEPTH INTEGRATED HOLOGRAPHIC ANIMATIONS SYSTEM

CROSS-REFERENCE TO RELATED APPLICATION

The present application claims priority to, and the benefit of, U.S. Provisional Application No. 63/491,346, which was filed on Mar. 21, 2023 and is incorporated herein by reference in its entirety.

FIELD OF THE INVENTION

The present invention generally relates to the field of "pepper's ghost" display system. More specifically, the present invention relates to a novel dynamic "pepper's ghost" display system designed to create immersive and interactive 3D holographic images. The system includes a reflective sheet angled to the viewer or audience, one or more display devices, one or more physical display object packs that include a plurality of physical objects. A centralized programmable controller oversees the synchronized operation of the display devices and physical object packs, enabling complex 3D animation shows. Accordingly, the present disclosure makes specific reference thereto. Nonetheless, it is to be appreciated that aspects of the present invention are also equally applicable to other like applications, devices, and methods of manufacture.

BACKGROUND

By way of background, "pepper's ghost" illusion creates the appearance of a 3D object using reflection and an angled positioned glass. In the illusion, light shines on a hidden object, reflecting off the angled glass onto the eyes of an observer. The observer perceives the reflected image as floating in mid-air, however the image is simply a 2D illusion and not a true 3D representation. The reflected image in conventional "pepper's ghost" display always appears at the same depth, like a flat image pasted onto the glass. Further, it is impossible in the conventional "pepper's ghost" display to show multiple objects at different depths to create a layered "in and out" effect like true 3D animation. As a result, displaying multiple scenes, characters, or backgrounds is not possible with conventional "pepper's ghost" display systems.

"pepper's ghost" displays are useful for creating eye-catching illusions, however, are not suited for true 3D animation with "in and out" effects or multiple scenes. Individuals resort to use of traditional 3D animation techniques to create complex 3D animations which is ineffective, time consuming, and unusable for stages. Therefore, individuals desire an improved display system that can offer 3D animation to virtual images and objects in a "pepper's ghost" based holographic system.

Therefore, there exists a long felt need in the art for an improved animation system that offers 3D animation to virtual images. There is also a long felt need in the art for a system that enables for perception of depth of field within a Peppers ghost hologram illusion. Additionally, there is a long felt need in the art for a novel system that moves display devices right, left, up, and down with animated videos and images to give off a real holographic effect. Moreover, there is a long felt need in the art for a system that uses multiple display devices and are moved in to all the dimensions to generate the 3D animation of a virtual image. Further, there is a long felt need in the art for a system that enables display devices to automatically and manually adjust. Furthermore, there is a long felt need in the art for a system that controls all animations and dynamic changes of physical objects. Finally, there is a long felt need in the art for a novel system that maintains different depth levels and movement of virtual images at different dimensions during the hologram or image illusion controlled by electrical, electronic, and mechanical components.

The subject matter disclosed and claimed herein, in one embodiment thereof, comprises a dynamic "pepper's ghost" display system. The system is designed to add depth and animation to a "pepper's ghost" display system and features a transparent or semi-transparent reflective sheet placed at an angle relative to an audience, one or more display devices capable of movement based on the location of objects within a video or image being displayed, thereby creating a dynamic and interactive holographic image. An object tracker is configured to analyze movements of objects within a video or image and to provide movement instructions to the display devices, thereby enabling the display devices to move in synchronization with the movements of objects within the video or image for an interactive viewer experience. Physical display objects are adapted to be dynamically positioned in hologram or image stage for providing different virtual images.

In this manner, the system of the present invention accomplishes all of the forgoing objectives and provides users a system that enhances the traditional "pepper's ghost" by adding depth and animation. The system includes a plurality of display devices such as projector/screen system or panel display unit and can be moved in all three dimensions to generate 3D animations. The movement is controlled based on the location of objects within the video or image being displayed, creating a dynamic and interactive holographic image. The system makes the holographic effect far more realistic than traditional "pepper's ghost" illusions by introducing depth and animated movements that are synchronized with the content being displayed.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a dynamic "pepper's ghost" display system. The system further comprising a transparent or semi-transparent reflective sheet placed at an angle relative to an audience, one or more display devices, wherein the movement of said display devices is controlled based on the location of objects within a video or image being displayed, thereby creating a dynamic and interactive holographic image. An object tracker is configured to analyze movements of objects within a video or image and to provide movement instructions to the display devices, thereby enabling the display devices to move in synchronization with the movements of objects within the video or image for an interactive viewer experience.

In yet another embodiment, a dynamic holographic stage system is disclosed. The system includes a transparent or semi-transparent reflective sheet positioned at an angle to an audience, one or more display devices to generate dynamic and interactive holographic images, an object tracker configured to analyze movements of objects within a video or image and to provide movement instructions enabling automatic or manual movement of the display devices. The system includes a plurality of physical display object packs, each containing multiple physical display objects capable of independent rotation to selectively present specific objects within the holographic stage. A centralized programmable controller is wired or wirelessly connected to the object tracker, a display movement controller, and physical display object packs, is configured to control the positioning and movement of display devices and the rotation of physical display object packs based on preconfigured user programs for the execution of complex 3D animation shows.

In another aspect, a holographic stage system is disclosed. The system includes a plurality of physical display object packs, each pack includes a plurality of physical display objects. Each physical display object pack is adapted to rotate along horizontal and longitudinal axes, wherein the rotation of each physical display object pack is controlled to selectively display of one object from the plurality of physical display objects within the holographic stage, for enhancing the dynamic and layered holographic illusion. A centralized programmable controller configured is to control the movement and positioning of the physical display objects, the rotation of physical display object packs based on preconfigured user programs, videos, and/or images, thereby facilitating automatic and complex 3D animation shows.

In yet another embodiment, a holographic display system is disclosed. The system includes a holographic stage, the stage includes a plurality of display devices, the system is configured to generate a multitude of virtual images using dynamic physical objects and display devices to create an immersive and dynamic holographic experience.

In a further embodiment, the display devices are controlled through both automatic and manual means; the automatic control includes a display movement controller and an object tracker for synchronized movement based on video feed. The manual control enables user interaction with the display device via a slider mechanism for adjusting the position of the display device.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
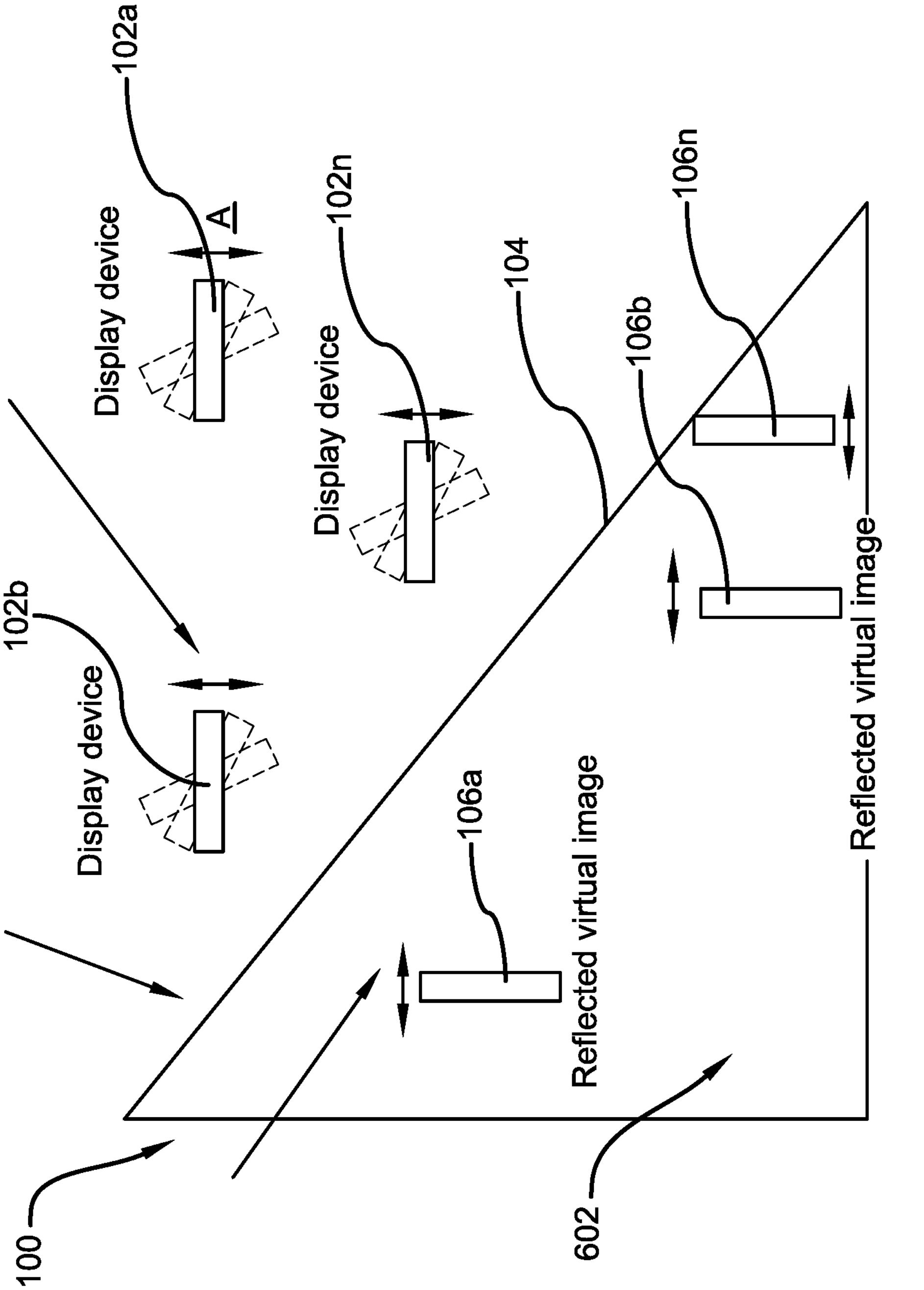
FIG. 1 illustrates a top-down perspective view of the dynamic "pepper's ghost" display system of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for an improved animation system that offers 3D animation to virtual images. There is also a long felt need in the art for a system that enables for perception of depth of field within a Peppers ghost hologram or image illusion. Additionally, there is a long felt need in the art for a novel system that moves display devices right, left, up, and down with animated videos and images to give off a 'real' holographic effect. Moreover, there is a long felt need in the art for a system that uses multiple display devices and are moved in to all the dimensions to generate the 3D animation of a virtual image. Further, there is a long felt need in the art for a system that enables display devices to automatically and manually adjust. Furthermore, there is a long felt need in the art for a system that controls all animations and dynamic changes of physical objects. Finally, there is a long felt need in the art for a novel system that maintains different depth levels and movement of virtual images at different dimensions during the hologram or image illusion controlled by electrical, electronic, and mechanical components.

The present invention, in one exemplary embodiment, is a holographic stage system. The system includes a plurality of physical display object packs, each pack includes a plurality of physical display objects. Each physical display object pack is adapted to rotate along horizontal and longitudinal axes, wherein the rotation of each physical display object pack is controlled to selectively display one object from the plurality of physical display objects within the holographic stage, for enhancing the dynamic and layered holographic illusion. A centralized programmable controller configured is to control the movement and positioning of the physical display objects, the rotation of physical display object packs based on preconfigured user programs, videos, and/or images, thereby facilitating automatic and complex 3D animation shows.

The dynamic "pepper's ghost" display system of the present invention uses a piece of glass or transparent material positioned at an angle to the viewer or audience. The display device (projector/screen system or panel display unit) can move in all three dimensions to generate 3D animations. Further, the movement of the display device is controlled based on the location of objects within the video or image being displayed, creating a dynamic and interactive holographic image. An object tracker analyzes the movements of objects within the video or image and feeds movement instructions responsible for moving the display device. The ability of the system to track objects within the video or image and move the display accordingly creates a more interactive and immersive experience for viewers.

Referring initially to the drawings, FIG. 1 illustrates a top-down perspective view of the dynamic "pepper's ghost" display system of the present invention in accordance with the disclosed architecture. The "pepper's ghost" display system 100 is designed to create a dynamic and interactive 3D hologram or image by manipulating both virtual and physical elements. The system 100 improves the illusion of convention "pepper's ghost" system by introducing depth perception and dynamic animations, making the illusion much more immersive and realistic.

As illustrated in FIG. 1, one or more display devices 102*a-n* are positioned at different angles to a partial transparent and partial reflective sheet 104. The display devices 102*a-n* are adapted to move vertically up and down as indicated by arrow "A" for simulating in-and-out animation effects of the one or more reflected virtual images 106*a-n*. The sheet 104 is placed at an angle from 40 degrees to 50 degrees and creates the illusion of the virtual images 106*a-n* appearing in physical space.

Each virtual image is formed by a corresponding display device. For example, the virtual image 106*a* can correspond to display object 102*a*, the virtual image 106*b* can correspond to the display object 102*b* and the virtual image 106*n* can correspond to the display object 102*n*.

Figure 2:
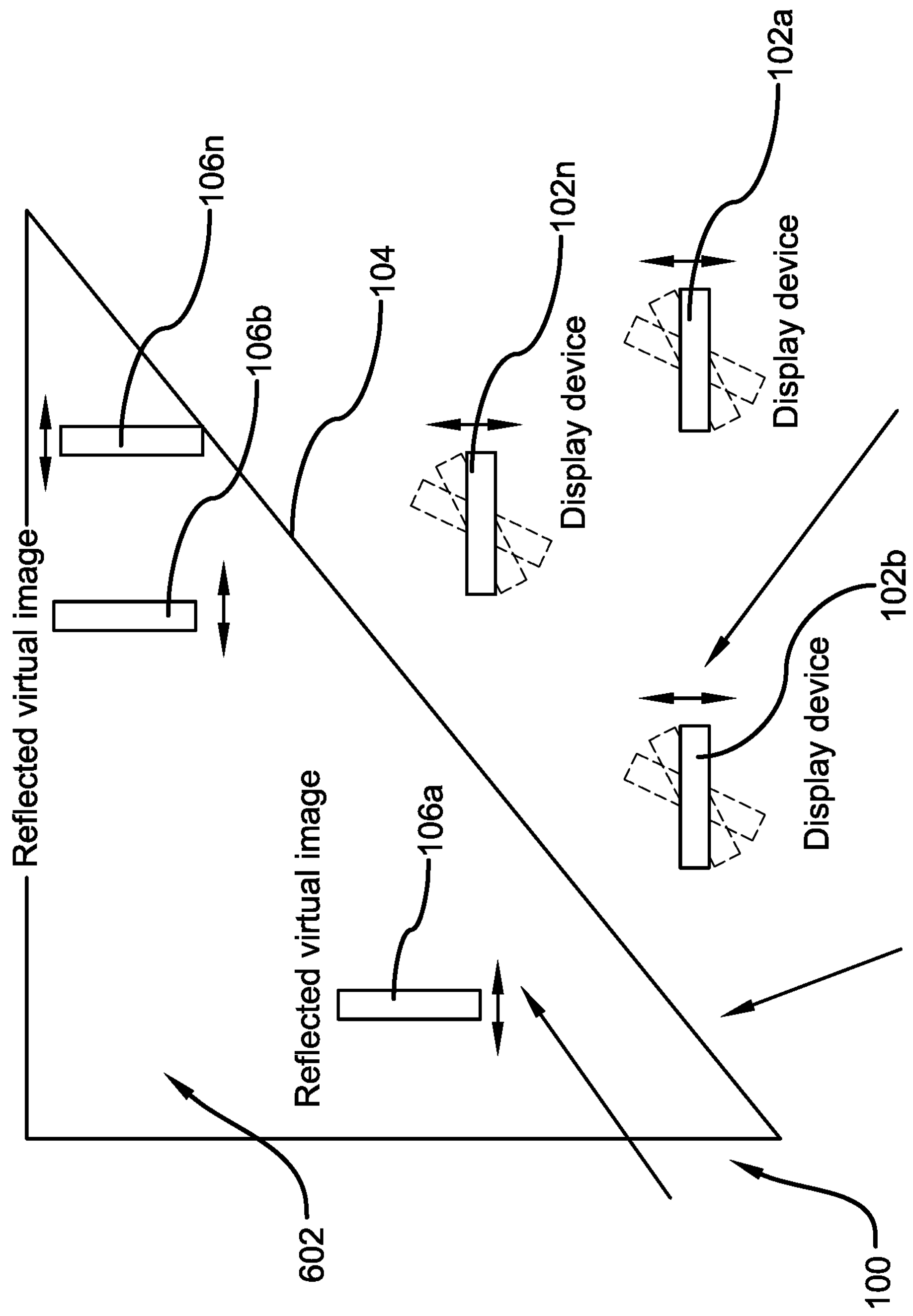
FIG. 2 illustrates a bottom-up view of the dynamic "pepper's ghost" display system of the present invention in accordance with the disclosed architecture.

FIG. 2 illustrates a bottom-up view of the dynamic "pepper's ghost" display system of the present invention in accordance with the disclosed architecture. The movement of a display object provides in and out animation to the reflected virtual image behind the sheet 104. The display devices 102*a-n* can be controlled and moved automatically and manually for creating a stable animation effect in the virtual images 106*a-n*.

Figure 3:
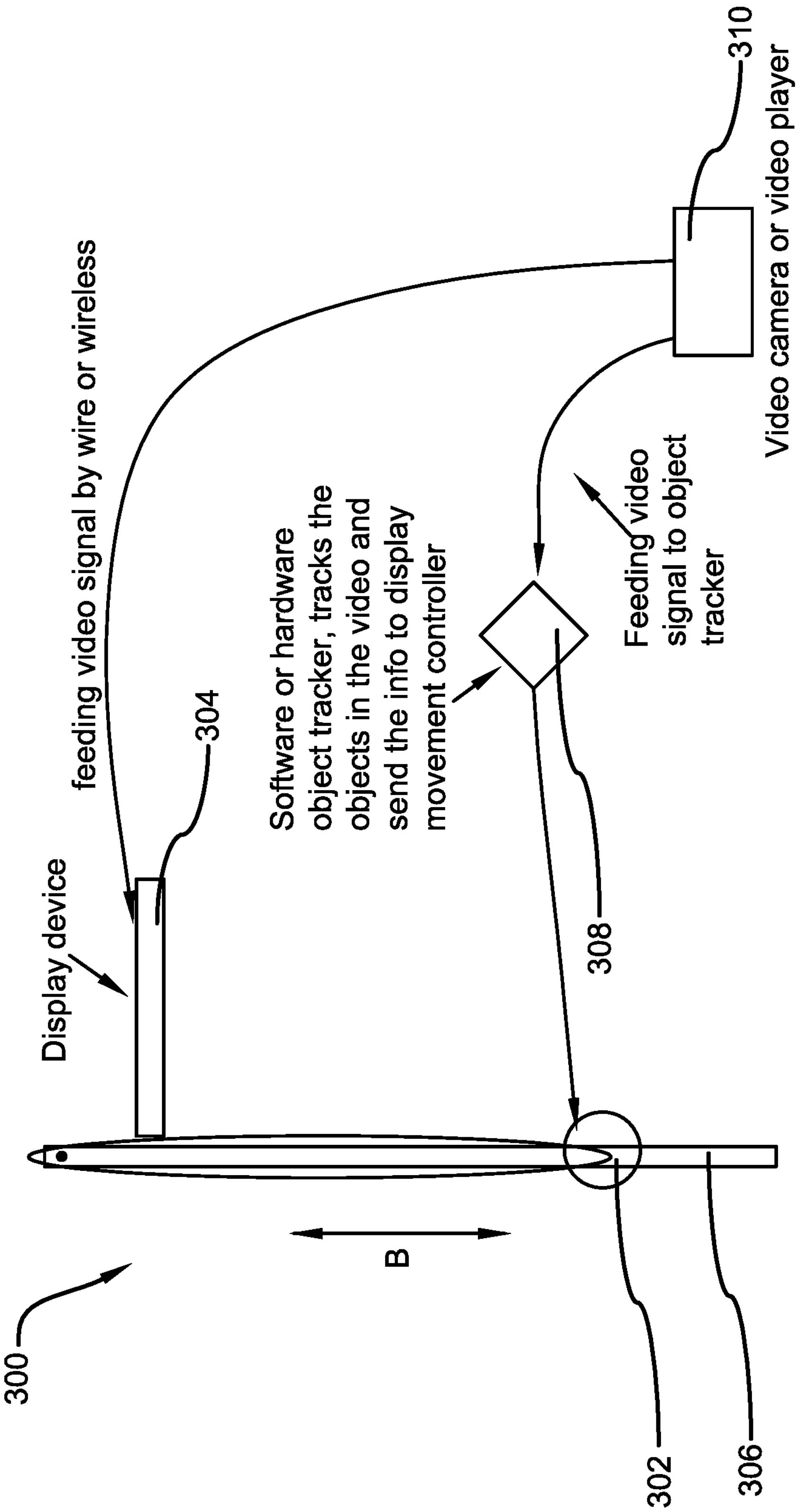
FIG. 3 illustrates a perspective view showing an automatic control system providing automated movement of the display devices for creating an animation effect in accordance with one embodiment of the present invention.

FIG. 3 illustrates a perspective view showing an automatic control system providing automated movement of the display devices for creating an animation effect in accordance with one embodiment of the present invention. The automatic control system 300 includes a display movement controller 302 for sliding the display device 304 along a sliding rail 306 in the direction indicated by arrow "B". The display movement controller 302 is adapted to communicate with an object tracker 308 which can be a hardware or software-based tracker. The object tracker 308 is configured to track objects in a video feed from a video camera or player 310. The tracked objects information is automatically transmitted to the display movement controller 302 and the information is used by the display movement controller 302 to automatically slide the display device 304. The position of the display device 304 is adjusted to match the virtual motion of the video feed from the device 310 for creating a synchronized holographic effect. The display device 304 can receive video from the device 310 using a wired or wireless medium depending on the architecture of the automatic display device control system 300.

Figure 4:
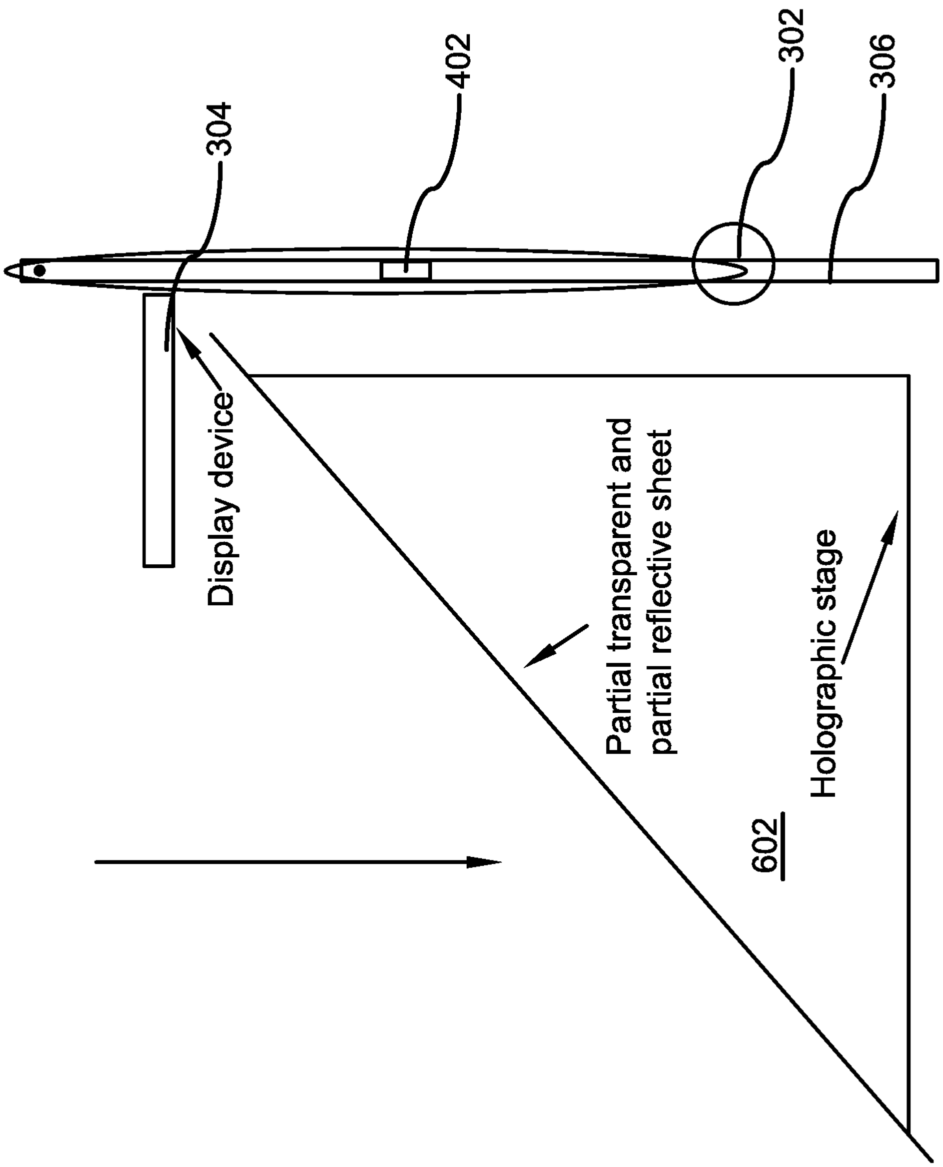
FIG. 4 illustrates a perspective view showing manual control of the display device for creating a synchronized holographic effect in accordance with one embodiment of the present invention.

FIG. 4 illustrates a perspective view showing manual control of the display device for creating a synchronized holographic effect in accordance with one embodiment of the present invention. As illustrated, the display device 304 of the holographic stage system 100 has the attached slider 402 which can be manually held by a user and slid along the sliding rail 306 for adjusting the position of the display device 304.

Figure 5:
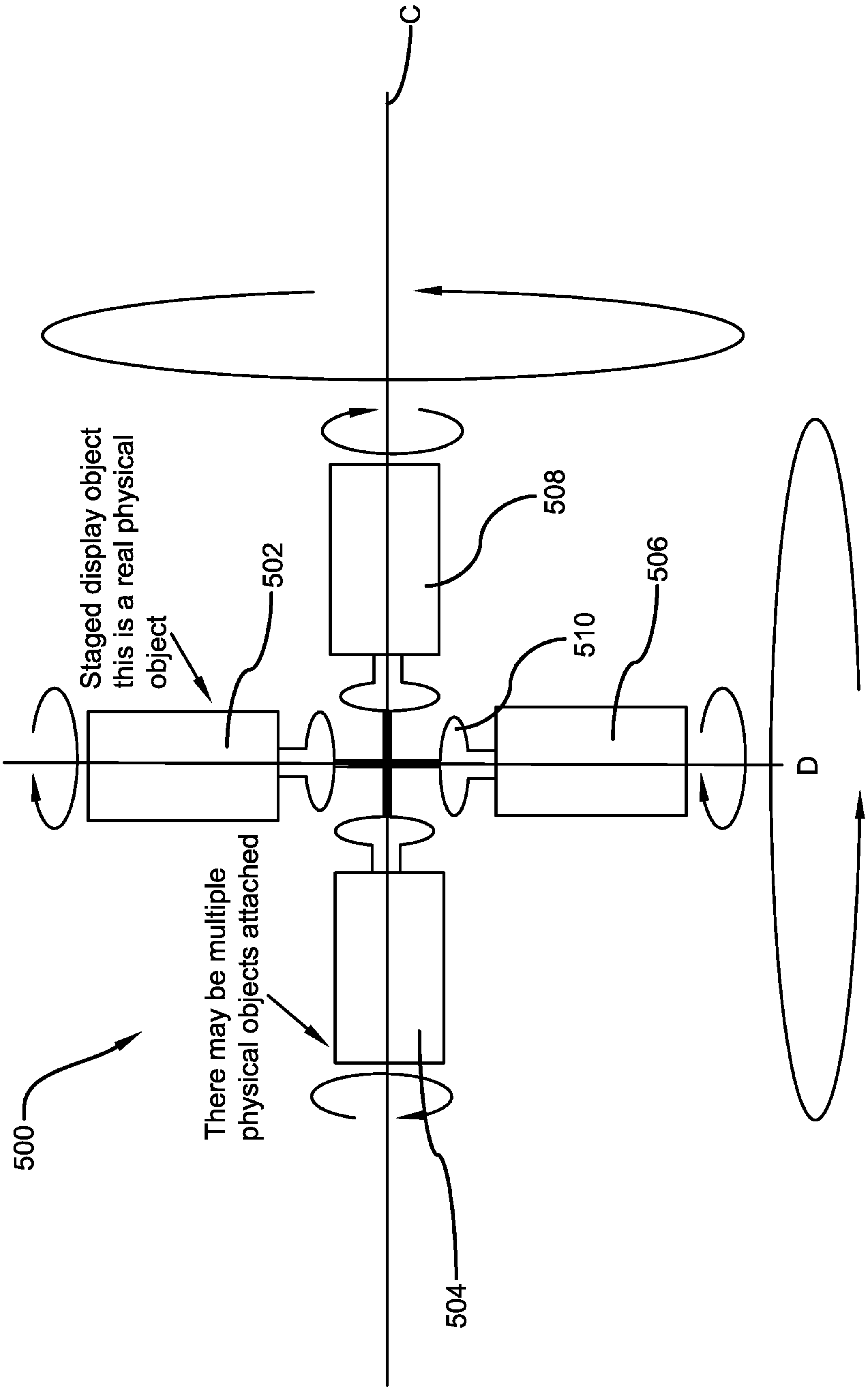
FIG. 5 illustrates an isolated view of an exemplary physical display object pack used in a holographic stage for changing physical objects in accordance with the disclosed embodiment.

FIG. 5 illustrates an isolated view of an exemplary physical display object pack used in a holographic stage for changing physical objects in accordance with the disclosed embodiment. The exemplary object pack 500 is adapted to be fixed inside the holographic stage and the object pack 500 can be rotated along imaginary horizontal axis as shown by arrow "C" and along imaginary longitudinal axis as shown by arrow "D".

Figure 6:
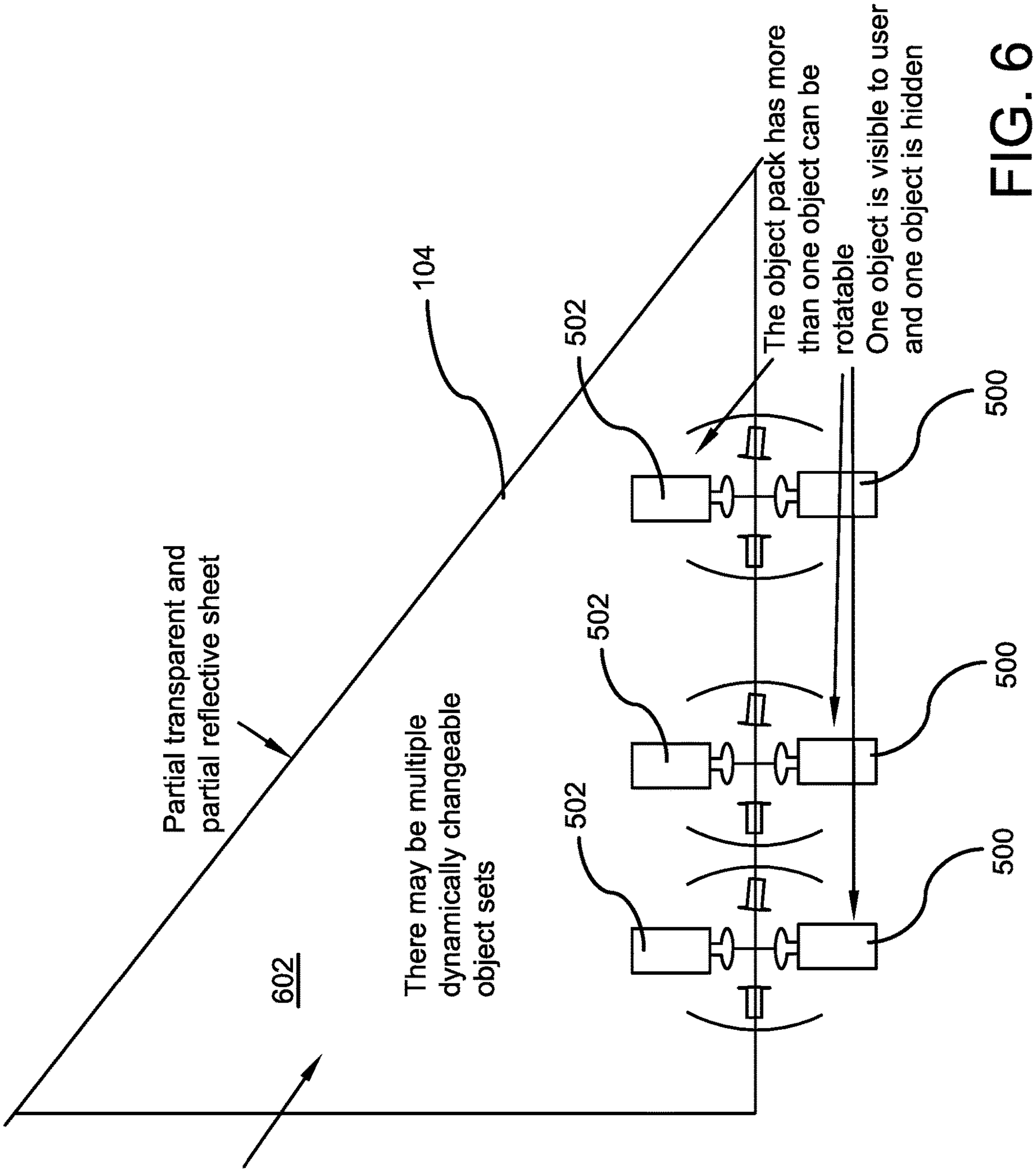
FIG. 6 illustrates a perspective view showing a plurality of the physical display object packs positioned in a holographic stage in accordance with the disclosed architecture.

The object pack 500 includes a plurality of physical display objects 502, 504, 506, 508 arranged in two opposing pairs formed by objects 502, 506 and 504, 508. Only one physical object out of the four physical objects is visible in the holographic stage. Remaining physical objects are positioned underneath the hidden area of the holographic stage as illustrated in FIG. 6. Individual physical display objects 502, 504, 506, 508 can also be rotated using the corresponding hinge 510 for setting the object in the holographic stage.

FIG. 6 illustrates a perspective view showing a plurality of the physical display object packs positioned in a holographic stage in accordance with the disclosed architecture. As illustrated, a plurality of physical display object packs 500 are positioned in the holographic stage 602 and each pack can be rotated individually and independently to change the displayed object dynamically, providing a physical layer to the holographic illusion. Using a plurality of physical display object packs 500 provides a more complex and layered holographic display, as different objects can be presented or hidden from view.

Figure 7:
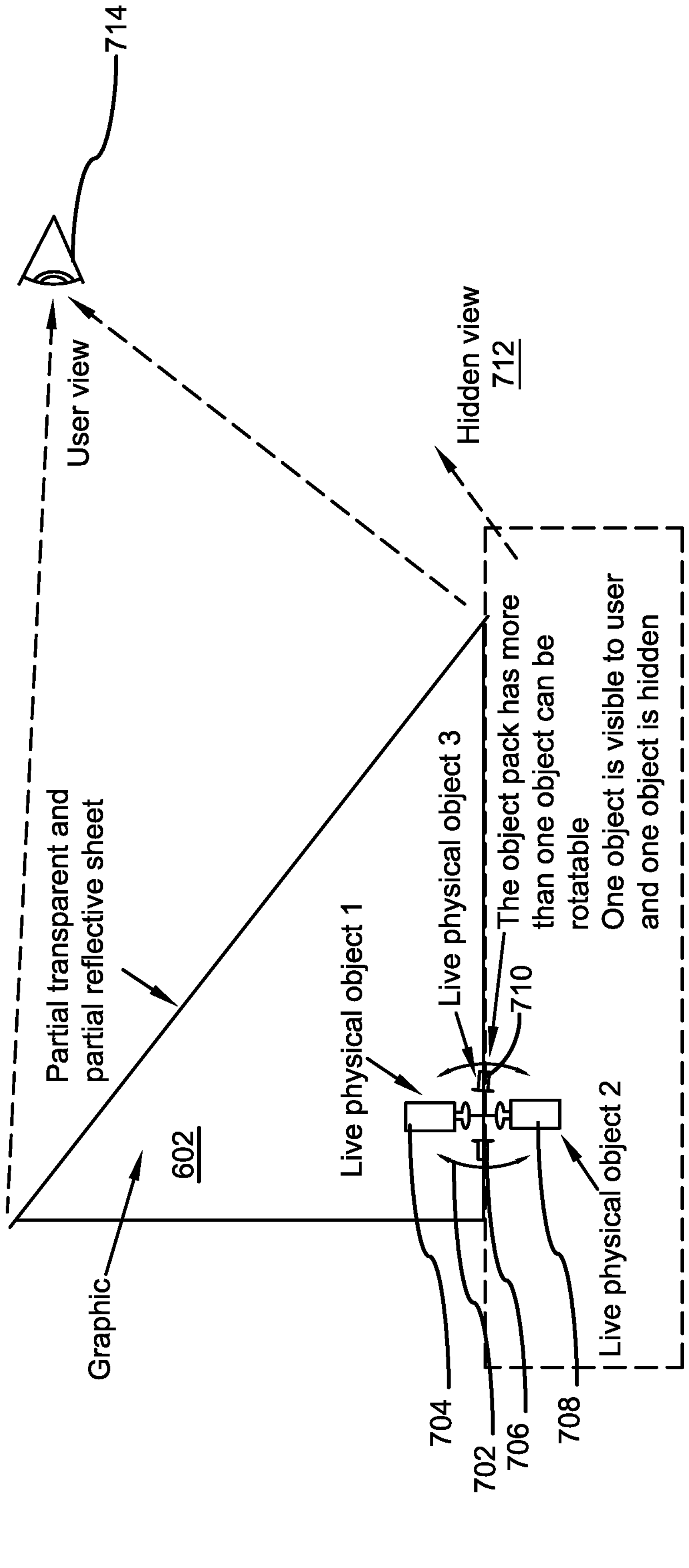
FIG. 7 illustrates a holographic stage set up relative to a user showing dynamic changing of the physical display objects in accordance with one embodiment of the present invention.

FIG. 7 illustrates a holographic stage set up relative to a user showing dynamic changing of the physical display objects in accordance with one embodiment of the present invention. The holographic stage 602 has the physical display object pack 702 with a first live physical display object 704 is positioned in the holographic stage 602 and the other three physical display objects 706, 708, 710 are hidden and are positioned in a hidden view 712 which is outside the field of view of the eye 714 of the user.

The physical display object pack 702 can rotate the physical display objects 704, 706, 708, 710 automatically to change the live object as illustrated in FIGS. 5 and 6.

Figure 8:
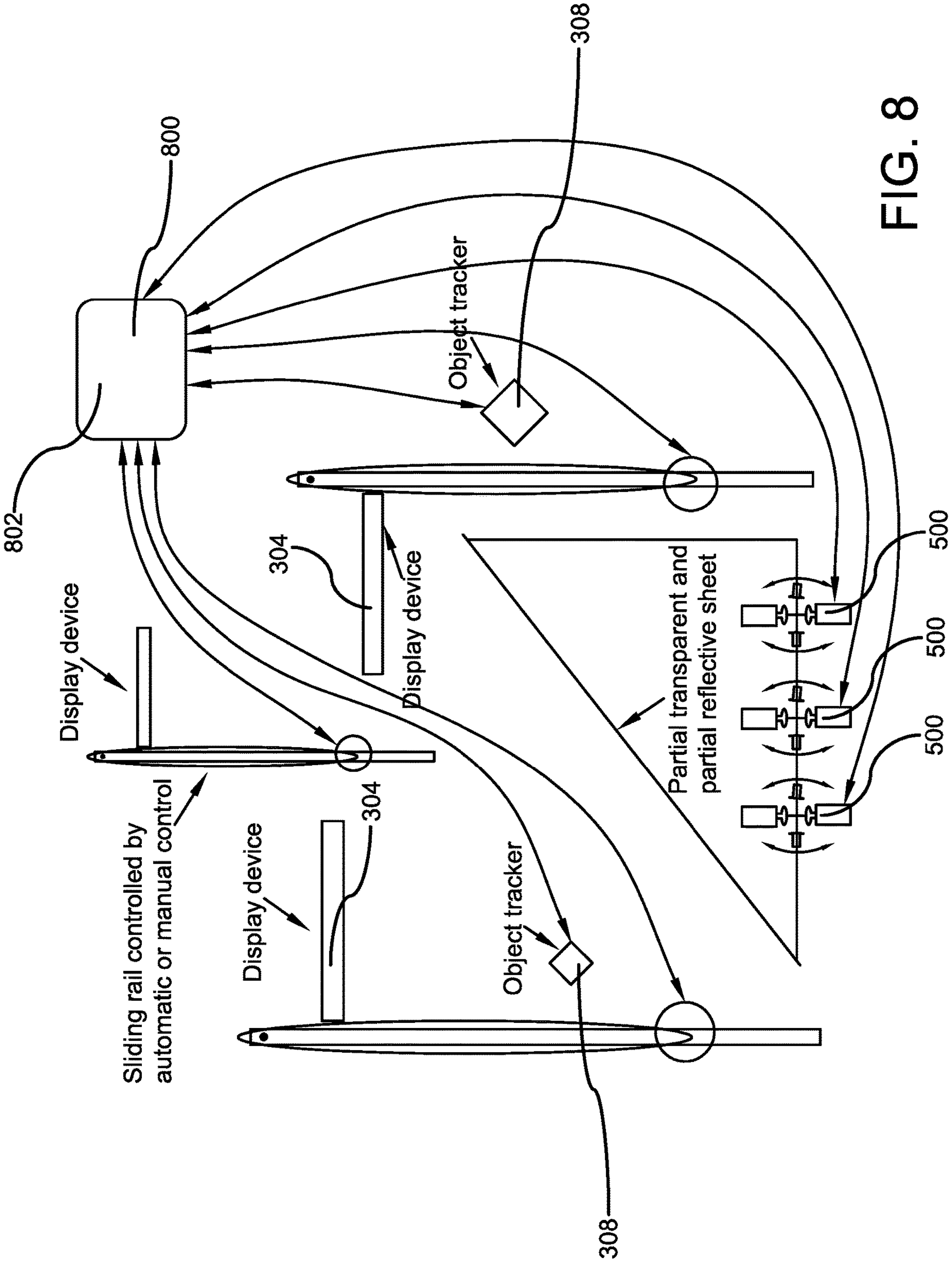
FIG. 8 illustrates a perspective view showing use of a centralized programmable controller for centrally controlling the components of the dynamic "pepper's ghost" display system of the present invention in accordance with the disclosed architecture.

FIG. 8 illustrates use of a centralized programmable controller for centrally controlling the components of the dynamic "pepper's ghost" display system of the present invention in accordance with the disclosed architecture. The centralized programmable controller 800 is adapted to control all the components used in the dynamic "pepper's ghost" display system 100 of the present invention. The centralized programmable controller 800 can be in the form of a specialized computer system and automatically conducts a 3D animation show based on a preconfigured user program. The controller 800 is wired or wirelessly connected to the object tracker 308 and the display movement controller 302 for automatic positioning of the display device 304.

The controller 800 is also coupled to each physical display object pack 500 for automatic rotation of the packs 500 to position a specific physical object in the holographic stage 602. The controller 800 can include a memory 802 for storing animation show configurations for automatic movement and positioning of different components of the holographic display system 100.

Figure 9:
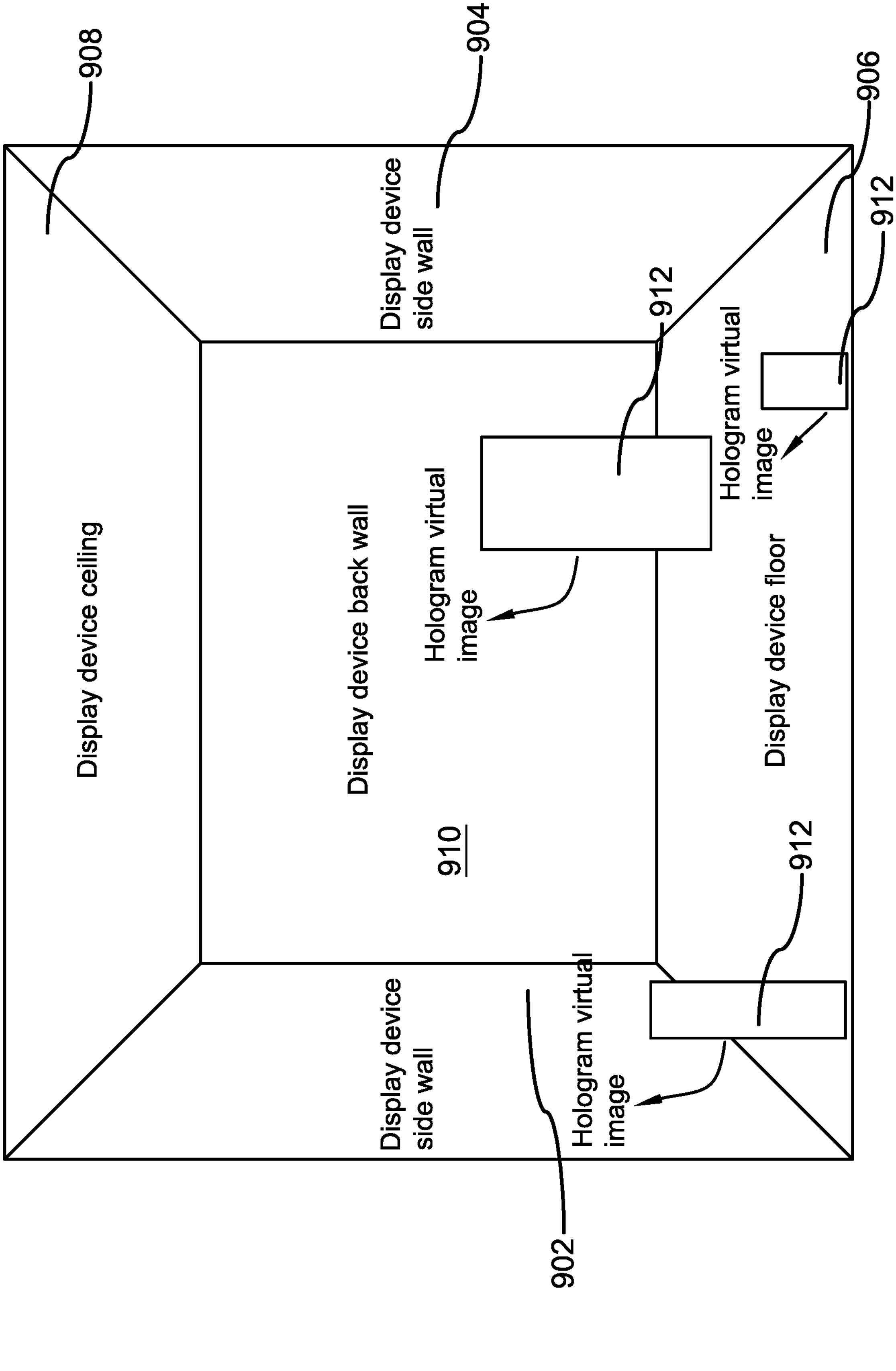
FIG. 9 illustrates a perspective view of the hologram or image stage surrounded by a plurality of display devices for creating a dynamic hologram or image set up in accordance with the disclosed structure.

FIG. 9 illustrates the hologram or image stage 602 surrounded by a plurality of display devices for creating a dynamic hologram or image set up in accordance with the disclosed structure. As illustrated, the hologram or image stage 602 includes a pair of opposite display device side walls 902, 904, a display device floor 906 and a display device ceiling 908. The stage 602 also includes a display device back wall 910. A plurality of hologram virtual images 912 are generated using the dynamic physical objects for creating a dynamic hologram experience.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "holographic display system", "holographic stage system", "dynamic "pepper's ghost" display system", ""pepper's ghost" display system", and "system" are interchangeable and refer to the dynamic depth integrated holographic animations system 100 of the present invention.

Notwithstanding the forgoing, the dynamic depth integrated holographic animations system 100 of the present invention can be of any suitable size and configuration as is known in the art without affecting the overall concept of the invention, provided that it accomplishes the above stated objectives. One of ordinary skill in the art will appreciate that the dynamic depth integrated holographic animations system 100 as shown in the FIGS. are for illustrative purposes only, and that many other sizes and shapes of the dynamic depth integrated holographic animations system 100 are well within the scope of the present disclosure. Although the dimensions of the dynamic depth integrated holographic animations system 100 are important design parameters for user convenience, the dynamic depth integrated holographic animations system 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An interactive display system to create a holographic scene, the interactive display system comprising:

a display object pack having a plurality of display objects positioned at different angles;

a holographic stage; and a sheet that is transparent and reflective;

wherein said display object pack positioned proximal to said holographic stage;

wherein said display object pack rotatable around a first horizontal axis and around a second longitudinal axis;

wherein said plurality of display objects having four display objects including a first pair of display objects and an opposing second pair of display objects;

wherein one of said four display objects visible in said holographic stage; and further wherein three of said four display objects not visible in said holographic stage.

2. The interactive display system to create a holographic scene of claim 1, wherein said four display objects are rotatable.

3. The interactive display system to create a holographic scene of claim 2, wherein said sheet includes an angle from 40 degrees to 50 degrees relative to said plurality of display objects for creating a plurality of images on said sheet.

4. The interactive display system to create a holographic scene of claim 3, wherein each of said plurality of images correspond to each of said plurality of display objects.

5. The interactive display system to create a holographic scene of claim 4, wherein each of said plurality of display objects movable vertically up and down to simulate movement of each of said plurality of images in and out.

6. The interactive display system to create a holographic scene of claim 5, wherein said plurality of display objects include an automatic control system for automatically moving said plurality of display objects for creating an animation of said plurality of images.

7. The interactive display system to create a holographic scene of claim 6, wherein said automatic control system moves selectively said plurality of display objects along a first rail in a first direction, and further wherein said automatic control system having an object tracker for tracking objects in a video feed from a video camera.

8. The interactive display system to create a holographic scene of claim 7, wherein movements of said tracked objects are automatically transmitted to said automatic control system for corresponding said moves of said plurality of display objects along said first rail.

9. The interactive display system to create a holographic scene of claim 8, wherein a position of each of said plurality of display objects are adjusted to match the virtual motion of said video feed for creating a synchronized holographic scene.

10. An interactive display system to create a holographic scene, the interactive display system comprising:

a plurality of display object packs wherein each of said plurality of display object packs having a plurality of display objects, a holographic stage, and a sheet that is transparent and reflective;

wherein said plurality of display object packs positioned proximal to said holographic stage;

wherein each one of said plurality of display object packs independently rotatable;

wherein each one of said plurality of display object packs having at least two display objects;

wherein one of said at least two display objects visible in said holographic stage; and further wherein one of said at least two display objects not visible in said holographic stage.

11. The interactive display system to create a holographic scene of claim 10, wherein said plurality of display object packs include an automatic control system for automatically moving said plurality of display object packs for creating an animation of a holographic scene.

12. The interactive display system to create a holographic scene of claim 11, wherein said automatic control system moves selectively said plurality of display object packs in a first direction, and further wherein said automatic control system having an object tracker for tracking objects in a video feed from a video camera.

13. The interactive display system to create a holographic scene of claim 12, wherein movements of said tracked objects are automatically transmitted to said automatic control system for corresponding said moves of said plurality of display object packs.

14. The interactive display system to create a holographic scene of claim 13, wherein a position of each of said plurality of display object packs are adjusted to match the virtual motion of said video feed for creating a synchronized said holographic scene.

* * * * *